United States Patent
Morshed et al.

(10) Patent No.: US 12,413,394 B2
(45) Date of Patent: Sep. 9, 2025

(54) KEY MANAGEMENT SYSTEM

(71) Applicant: XILINX, INC., San Jose, CA (US)

(72) Inventors: Abbas Morshed, Los Altos, CA (US); Ygal Arbel, Morgan Hill, CA (US); Balakrishna Jayadev, Mountain View, CA (US); Eun Mi Kim, San Jose, CA (US)

(73) Assignee: XILINX, INC., San Jose, CA (US)

( * ) Notice: Subject to any disclaimer, the term of this patent is extended or adjusted under 35 U.S.C. 154(b) by 115 days.

(21) Appl. No.: 18/113,588

(22) Filed: Feb. 23, 2023

(65) Prior Publication Data

US 2024/0291635 A1    Aug. 29, 2024

(51) Int. Cl.
*H04L 29/06*    (2006.01)
*G06F 21/60*    (2013.01)
*H04L 9/08*    (2006.01)

(52) U.S. Cl.
CPC ......... *H04L 9/0825* (2013.01); *G06F 21/602* (2013.01); *H04L 9/0894* (2013.01)

(58) Field of Classification Search
CPC ... H04L 9/0825; H04L 9/0894; H04L 9/0891; G06F 21/602; G06F 12/02
See application file for complete search history.

(56) References Cited

U.S. PATENT DOCUMENTS

| | | | | |
|---|---|---|---|---|
| 2011/0191594 A1* | 8/2011 | Bartlett | ............... | G06F 11/2056 713/189 |
| 2012/0297111 A1* | 11/2012 | Hsu | ..................... | G11C 16/3427 711/E12.008 |
| 2013/0163753 A1* | 6/2013 | MacMillan | ........... | H04L 9/0891 380/44 |
| 2017/0257214 A1* | 9/2017 | Stufflebeam | ............. | H04L 63/20 |
| 2018/0167206 A1* | 6/2018 | Raza | ..................... | H04L 9/0891 |
| 2018/0316500 A1* | 11/2018 | Xu | ....................... | H04L 63/0435 |
| 2019/0007207 A1* | 1/2019 | Roth | ..................... | H04L 9/0891 |
| 2022/0239478 A1* | 7/2022 | Pocas | .................... | H04L 9/0825 |

* cited by examiner

*Primary Examiner* — Yogesh Paliwal
(74) *Attorney, Agent, or Firm* — Patterson + Sheridan, LLP

(57) ABSTRACT

Examples herein describe techniques for method of accessing encrypted data. The techniques include receiving, via a memory controller, a first memory request to a first memory region, where the first memory region is encrypted based on a first key, and incrementing, based on the first memory request, a first counter associated with the first key. The techniques further include, in response to determining that the first counter exceeds a first threshold, initiating a key rolling operation to cause the first memory region to be encrypted based on a second key. The techniques further include tracking an address range of the first memory region that has been encrypted based on the second key, and, in response to determining that an address of a second memory request is outside of the address range, causing the second memory request to be completed based on the first key.

18 Claims, 6 Drawing Sheets

| Counters 312-0 | |
|---|---|
| Entry | Counter |
| 0 | 112 |
| 1 | 801 |
| 2 | 801 |
| 3 | 1071 |
| 4 | 439 |
| . | . |
| . | . |
| . | . |
| n | # |

| Key Array 314-0 | | |
|---|---|---|
| Entry | Key | Status |
| 0 | [key 0] | 1 |
| 1 | [key 1] | 1 |
| 2 | [key 1] | 1 |
| 3 | [key 2] | 0 |
| 4 | [key 3] | 1 |
| . | . | . |
| . | . | . |
| . | . | . |
| n | [key n] | # |

| Counters 312-1 | |
|---|---|
| Entry | Counter |
| 0 | 503 |
| 1 | 1037 |
| 2 | 36 |
| 3 | 218 |
| 4 | 218 |
| . | . |
| . | . |
| . | . |
| n | # |

| Key Array 314-1 | | |
|---|---|---|
| Entry | Key | Status |
| 0 | [key 0] | 1 |
| 1 | [key 1] | 0 |
| 2 | [key 2] | 1 |
| 3 | [key 3] | 1 |
| 4 | | 1 |
| . | . | . |
| . | . | . |
| . | . | . |
| n | [key n] | # |

FIG. 4

KEY MANAGEMENT SYSTEM

TECHNICAL FIELD

Examples of the present disclosure generally relate to a key management system, and more specifically, to performing key rolling with a memory device.

BACKGROUND

Increasingly, computing systems are requiring storage (e.g., DRAM) to be encrypted due to the prevalence of sophisticated attacks, such as side-channel attacks (e.g., differential power analysis (DPA) and simple power analysis (SPA) attacks). In such attacks, an adversary monitors power supply rail(s) connected to an encryption module. By analyzing noise on the power rails over a sufficient period of time, the attacker can detect encryption key values. Various countermeasures exist to mitigate and disrupt such attacks, but potential weaknesses in encrypted memory systems continue to pose a threat to data security.

SUMMARY

Techniques for accessing encrypted data. In one example, a method includes receiving, via a memory controller, a first memory request to a first memory region, wherein the first memory region is encrypted based on a first key, and incrementing, based on the first memory request, a first counter associated with the first key. The method further includes, in response to determining that the first counter exceeds a first threshold, initiating a key rolling operation to cause the first memory region to be encrypted based on a second key. The method further includes tracking an address range of the first memory region that has been encrypted based on the second key, receiving, via the memory controller, a second memory request to the first memory region, and, in response to determining that an address of the second memory request is outside of the address range of the first memory region that has been encrypted based on the second key, causing the second memory request to be completed based on the first key.

One example described herein is a key management system. The key management system includes a memory controller, and a key management controller coupled to the memory controller. The key management controller is configured to receive, via the memory controller, a first memory request to a first memory region, where the first memory region is encrypted based on a first key, and increment, based on the first memory request, a first counter associated with the first key. The key management controller is further configured to, in response to determining that the first counter exceeds a first threshold, initiate a key rolling operation to cause the first memory region to be encrypted based on a second key. The key management controller is further configured to track an address range of the first memory region that has been encrypted based on the second key, receive, via the memory controller, a second memory request to the first memory region, and, in response to determining that an address of the second memory request is outside of the address range of the first memory region that has been encrypted based on the second key, cause the second memory request to be completed based on the first key.

One example described herein is computing system. The computing system includes one or more processing cores, a memory, a memory controller coupled to the memory and the one or more processing cores, and a key management controller coupled to the memory controller. The key management controller is configured to receive, via the memory controller, a first memory request to a first memory region, where the first memory region is encrypted based on a first key, and increment, based on the first memory request, a first counter associated with the first key. The key management controller is further configured to, in response to determining that the first counter exceeds a first threshold, initiate a key rolling operation to cause the first memory region to be encrypted based on a second key. The key management controller is further configured to track an address range of the first memory region that has been encrypted based on the second key, receive, via the memory controller, a second memory request to the first memory region, and, in response to determining that an address of the second memory request is outside of the address range of the first memory region that has been encrypted based on the second key, cause the second memory request to be completed based on the first key.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 illustrates key arrays and usage counters that may be implemented by key management system, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
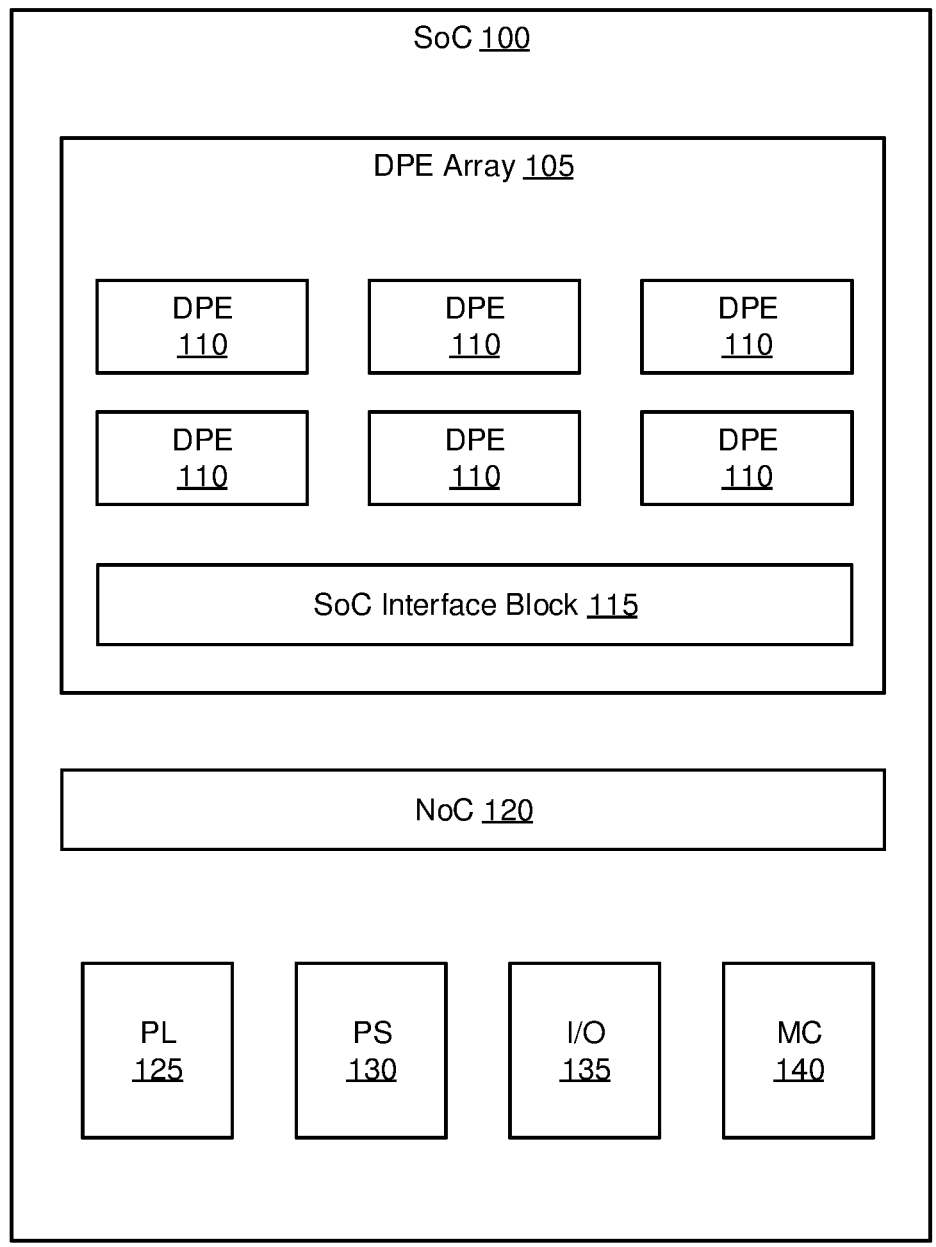
FIG. 1 is a block diagram of a SoC that includes a data processing engine array, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for accessing encrypted data and managing keys that are implemented to encrypt/decrypt the data. A key management system may track the usage of encryption keys and change the keys being used to encrypt/decrypt different regions of memory (i) when a threshold number of memory requests have been received, (ii) based on a timer, and/or (iii) in response to detecting suspicious activity (e.g., an elevated rate of memory requests for a particular region of memory). The key management system enables key rolling—an operation in which a region of memory is transitioned from one encryption key to another encryption key—to be performed seamlessly on a region of memory, while still enabling read and write requests to be completed with respect to the region of memory.

FIG. 1 is a block diagram of a SoC 100 that includes a data processing engine (DPE) array 105, according to an example. The DPE array 105 includes a plurality of DPEs 110 which may be arranged in a grid, cluster, or checkerboard pattern in the SoC 100. Although FIG. 1 illustrates arranging the DPEs 110 in a 2D array with rows and columns, the embodiments are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the embodiments herein are not limited to DPEs 110. Instead, the SoC 100 can include an array of any kind of processing elements, for example, the DPEs 110 could be digital signal processing engines, cryptographic engines, Forward Error Correction (FEC) engines, or other specialized hardware for performing one or more specialized tasks.

In FIG. 1, the array 105 includes DPEs 110 that are all the same type (e.g., a homogeneous array). However, in another embodiment, the array 105 may include different types of engines. For example, the array 105 may include digital signal processing engines, cryptographic engines, graphic processing engines, and the like. Regardless of whether the array 105 is homogenous or heterogeneous, the DPEs 110 can include direct connections between DPEs 110 which permit the DPEs 110 to transfer data directly as described in more detail below.

In one embodiment, the DPEs 110 are formed from software-configurable hardened logic (i.e., are hardened). One advantage of doing so is that the DPEs 110 may take up less space in the SoC 100 relative to using programmable logic to form the hardware elements in the DPEs 110. That is, using hardened logic circuitry to form the hardware elements in the DPE 110 such as program memories, an instruction fetch/decode unit, fixed-point vector units, floating-point vector units, arithmetic logic units (ALUs), multiply accumulators (MAC), and the like can significantly reduce the footprint of the array 105 in the SoC 100. Although the DPEs 110 may be hardened, this does not mean the DPEs 110 are not programmable. That is, the DPEs 110 can be configured when the SoC 100 is powered on or rebooted to perform different functions or tasks.

The DPE array 105 also includes a SoC interface block 115 (also referred to as a shim) that serves as a communication interface between the DPEs 110 and other hardware components in the SoC 100. In this example, the SoC 100 includes a network on chip (NoC) 120 that is communicatively coupled to the SoC interface block 115. Although not shown, the NoC 120 may extend throughout the SoC 100 to permit the various components in the SoC 100 to communicate with each other. For example, in one physical implementation, the DPE array 105 may be disposed in an upper right portion of the integrated circuit forming the SoC 100.

However, using the NoC 120, the array 105 can nonetheless communicate with, for example, programmable logic (PL) 125, a processor subsystem (PS) 130, input/output (I/O) 135, or memory controller (MC) 140 which may be disposed at different locations throughout the SoC 100.

In addition to providing an interface between the DPEs 110 and the NoC 120, the SoC interface block 115 may also provide a connection directly to a communication fabric in the PL 125. In this example, the PL 125 and the DPEs 110 form a heterogeneous processing system since some of the kernels in a dataflow graph may be assigned to the DPEs 110 for execution while others are assigned to the PL 125. While FIG. 1 illustrates a heterogeneous processing system in a SoC, in other examples, the heterogeneous processing system can include multiple devices or chips. For example, the heterogeneous processing system could include two FPGAs or other specialized accelerator chips that are either the same type or different types. Further, the heterogeneous processing system could include two communicatively coupled SoCs.

In one embodiment, the SoC interface block 115 includes separate hardware components for communicatively coupling the DPEs 110 to the NoC 120 and to the PL 125 that is disposed near the array 105 in the SoC 100. In one embodiment, the SoC interface block 115 can stream data directly to a fabric for the PL 125. For example, the PL 125 may include an FPGA fabric which the SoC interface block 115 can stream data into, and receive data from, without using the NoC 120. That is, the circuit switching and packet switching described herein can be used to communicatively couple the DPEs 110 to the SoC interface block 115 and also to the other hardware blocks in the SoC 100. In another example, SoC interface block 115 may be implemented in a different die than the DPEs 110. In yet another example, DPE array 105 and at least one subsystem may be implemented in a same die while other subsystems and/or other DPE arrays are implemented in other dies. Moreover, the streaming interconnect and routing described herein with respect to the DPEs 110 in the DPE array 105 can also apply to data routed through the SoC interface block 115.

Although FIG. 1 illustrates one block of PL 125, the SoC 100 may include multiple blocks of PL 125 (also referred to as configuration logic blocks) that can be disposed at different locations in the SoC 100. For example, the SoC 100 may include hardware elements that form a field programmable gate array (FPGA). However, in other embodiments, the SoC 100 may not include any PL 125—e.g., the SoC 100 may be an ASIC.

In some embodiments, MC 140 communicates with DPE Array 105, PL 125, and PS 130 via NoC 120. For example, MC 140 may interface with one or more memory modules (e.g., a DRAM module, high-bandwidth memory (HBM) module, SSD, HDD, etc.) and transfer data from the one or more memory modules to DPE Array 105, PL 125, and/or PS 130 via NoC 120. In some embodiments, MC 140 interfaces with one or more memory modules included in SoC 100 (e.g., SRAM).

Figure 2:
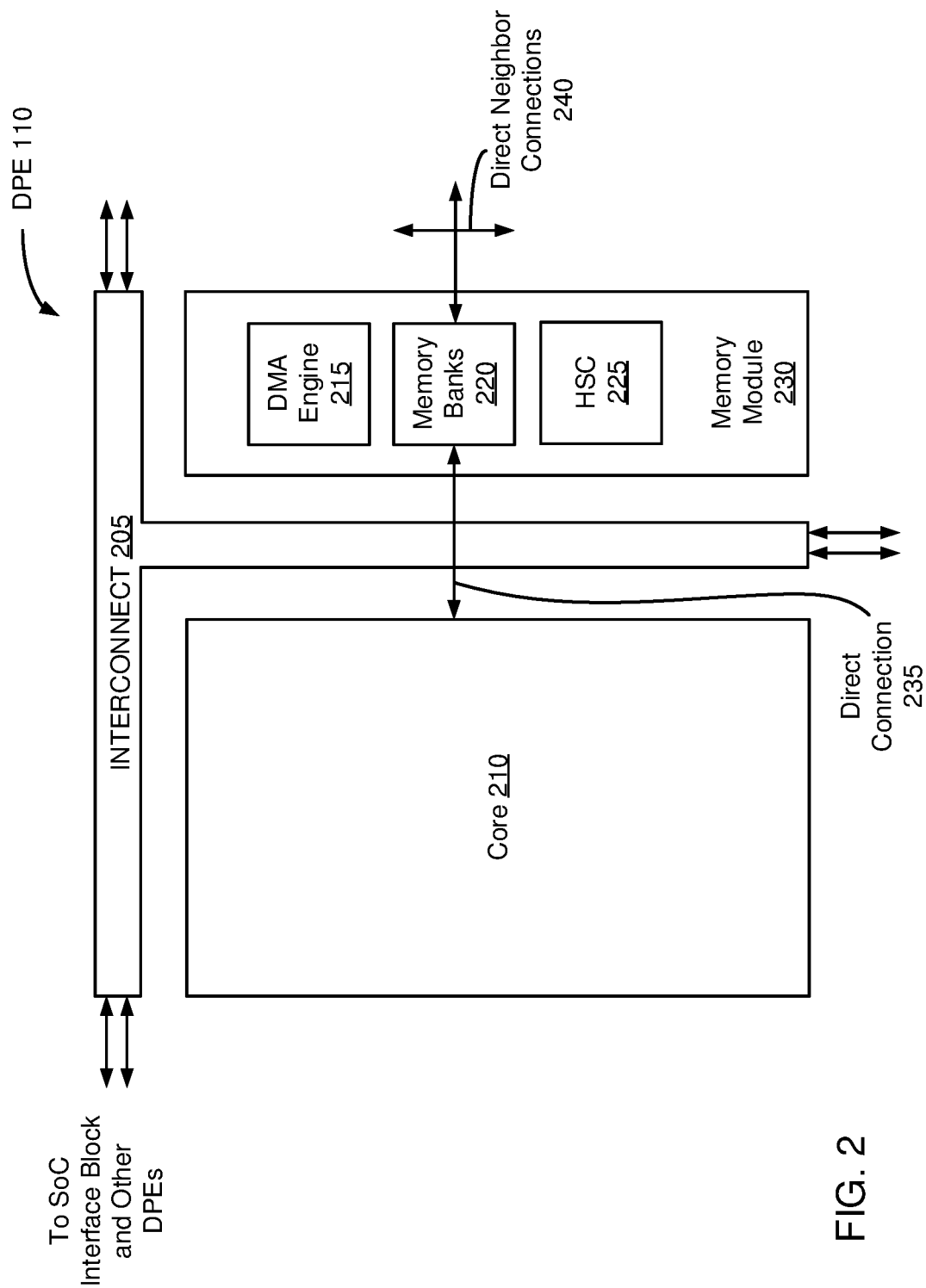
FIG. 2 is a block diagram of a data processing engine in the data processing engine array, according to an example.

FIG. 2 is a block diagram of a DPE 110 in the DPE array 105 illustrated in FIG. 1, according to an example. The DPE 110 includes an interconnect 205, a core 210, and a memory module 230. The interconnect 205 permits data to be transferred from the core 210 and the memory module 230 to different cores in the array 105. That is, the interconnect 205 in each of the DPEs 110 may be connected to each other so that data can be transferred north and south (e.g., up and down) as well as east and west (e.g., right and left) in the array of DPEs 110.

Referring back to FIG. 1, in one embodiment, the DPEs 110 in the upper row of the array 105 rely on the interconnects 205 in the DPEs 110 in the lower row to communicate with the SoC interface block 115. For example, to transmit data to the SoC interface block 115, a core 210 in a DPE 110 in the upper row transmits data to its interconnect 205 which is in turn communicatively coupled to the interconnect 205 in the DPE 110 in the lower row. The interconnect 205 in the lower row is connected to the SoC interface block 115. The process may be reversed where data intended for a DPE 110 in the upper row is first transmitted from the SoC interface block 115 to the interconnect 205 in the lower row and then to the interconnect 205 in the upper row that is the target DPE 110. In this manner, DPEs 110 in the upper rows may rely on the interconnects 205 in the DPEs 110 in the lower rows to transmit data to and receive data from the SoC interface block 115.

In one embodiment, the interconnect 205 includes a configurable switching network that permits the user to determine how data is routed through the interconnect 205. In one embodiment, unlike in a packet routing network, the interconnect 205 may form streaming point-to-point connections. That is, the streaming connections and streaming interconnects (not shown in FIG. 2) in the interconnect 205 may form routes from the core 210 and the memory module 230 to the neighboring DPEs 110 or the SoC interface block 115. Once configured, the core 210 and the memory module 230 can transmit and receive streaming data along those routes. In one embodiment, the interconnect 205 is configured using the Advanced Extensible Interface (AXI) 4 Streaming protocol.

In addition to forming a streaming network, the interconnect 205 may include a separate network for programming or configuring the hardware elements in the DPE 110. Although not shown, the interconnect 205 may include a memory mapped interconnect which includes different connections and switch elements used to set values of configuration registers in the DPE 110 that alter or set functions of the streaming network, the core 210, and the memory module 230.

In one embodiment, streaming interconnects (or network) in the interconnect 205 support two different modes of operation referred to herein as circuit switching and packet switching. In one embodiment, both of these modes are part of, or compatible with, the same streaming protocol—e.g., an AXI Streaming protocol. Circuit switching relies on reserved point-to-point communication paths between a source DPE 110 to one or more destination DPEs 110. In one embodiment, the point-to-point communication path used when performing circuit switching in the interconnect 205 is not shared with other streams (regardless whether those streams are circuit switched or packet switched). However, when transmitting streaming data between two or more DPEs 110 using packet-switching, the same physical wires can be shared with other logical streams.

The core 210 may include hardware elements for processing digital signals. For example, the core 210 may be used to process signals related to wireless communication, radar, vector operations, machine learning applications, and the like. As such, the core 210 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 110. The hardware elements in the core 210 may change depending on the engine type. That is, the cores in a digital signal processing engine, cryptographic engine, or FEC may be different.

The memory module 230 includes a DMA engine 215, memory banks 220, and hardware synchronization circuitry (HSC) 225 or other type of hardware synchronization block. In one embodiment, the DMA engine 215 enables data to be received by, and transmitted to, the interconnect 205. That is, the DMA engine 215 may be used to perform DMA reads and write to the memory banks 220 using data received via the interconnect 205 from the SoC interface block or other DPEs 110 in the array.

The memory banks 220 can include any number of physical memory elements (e.g., SRAM). For example, the memory module 230 may be include 4, 8, 16, 32, etc. different memory banks 220. In this embodiment, the core 210 has a direct connection 235 to the memory banks 220. Stated differently, the core 210 can write data to, or read data from, the memory banks 220 without using the interconnect 205. That is, the direct connection 235 may be separate from the interconnect 205. In one embodiment, one or more wires in the direct connection 235 communicatively couple the core 210 to a memory interface in the memory module 230 which is in turn coupled to the memory banks 220.

In one embodiment, the memory module 230 also has direct connections 240 to cores in neighboring DPEs 110. Put differently, a neighboring DPE in the array can read data from, or write data into, the memory banks 220 using the direct neighbor connections 240 without relying on their interconnects or the interconnect 205 shown in FIG. 2. The HSC 225 can be used to govern or protect access to the memory banks 220. In one embodiment, before the core 210 or a core in a neighboring DPE can read data from, or write data into, the memory banks 220, the core (or the DMA engine 215) requests a lock acquire to the HSC 225 when it wants to read or write to the memory banks 220 (e.g., when the core/DMA engine want to "own" a buffer, which is an assigned portion of the memory banks 220. If the core or DMA engine does not acquire the lock, the HSC 225 will stall (e.g., stop) the core or DMA engine from accessing the memory banks 220. When the core or DMA engine is done with the buffer, they release the lock to the HSC 225. In one embodiment, the HSC 225 synchronizes the DMA engine 215 and core 210 in the same DPE 110 (e.g., memory banks 220 in one DPE 110 are shared between the DMA engine 215 and the core 210). Once the write is complete, the core (or the DMA engine 215) can release the lock which permits cores in neighboring DPEs to read the data.

Key Management System

Increasingly, computing systems are requiring storage (e.g., DRAM) to be encrypted due to the prevalence of sophisticated attacks, such as side-channel attacks (e.g., differential power analysis (DPA) and simple power analysis (SPA) attacks). In such attacks, an adversary monitors power supply rail(s) connected to an encryption module. By analyzing noise on the power rails over a sufficient period of time, the attacker can detect encryption key values. Various countermeasures exist to mitigate and disrupt such attacks, but potential weaknesses in encrypted memory systems continue to pose a threat to data security.

In various embodiments, a key management system may be implemented in order to track the usage of encryption keys and change the keys being used to encrypt/decrypt different regions of memory (i) when a threshold number of memory requests have been received, (ii) based on a timer, and/or (iii) in response to detecting suspicious activity (e.g., an elevated rate of memory requests for a particular region of memory). The key management system enables key rolling—an operation in which a region of memory is transitioned from one encryption key to another encryption key—to be performed seamlessly on a region of memory, while still enabling read and write requests to be completed with respect to the region of memory.

Side-channel attacks, such as the DPA and SPA attacks noted above, typically require one or more power rails coupled to an encryption module to be monitored for thousands or millions of memory requests before a full key can be detected. Accordingly, in various embodiments, the key management system enables key rolling to be initiated once a threshold number of memory accesses have been performed (e.g., 100 write requests, 1,000 write requests, 1 M write requests). Additionally, a second, higher threshold may be implemented to accelerate the rate at which key rolling is performed, for example, if an attacker is aggressively targeting a particular region of memory with an elevated rate of memory requests in order to more quickly discover the corresponding key. Bandwidth allocated to user memory requests may be throttled or eliminated, while bandwidth allocated to the key rolling operation may be increased, enabling the key rolling operation to complete—and a new encryption key to be implemented—before an attacker can detect the previous encryption key. This process may be performed repeatedly for each threshold number of memory requests (or timer period), perpetually preventing the attacker from obtaining an encryption key to access sensitive data. Such techniques are described below in further detail in conjunction with FIGS. 3-6.

Figure 3:
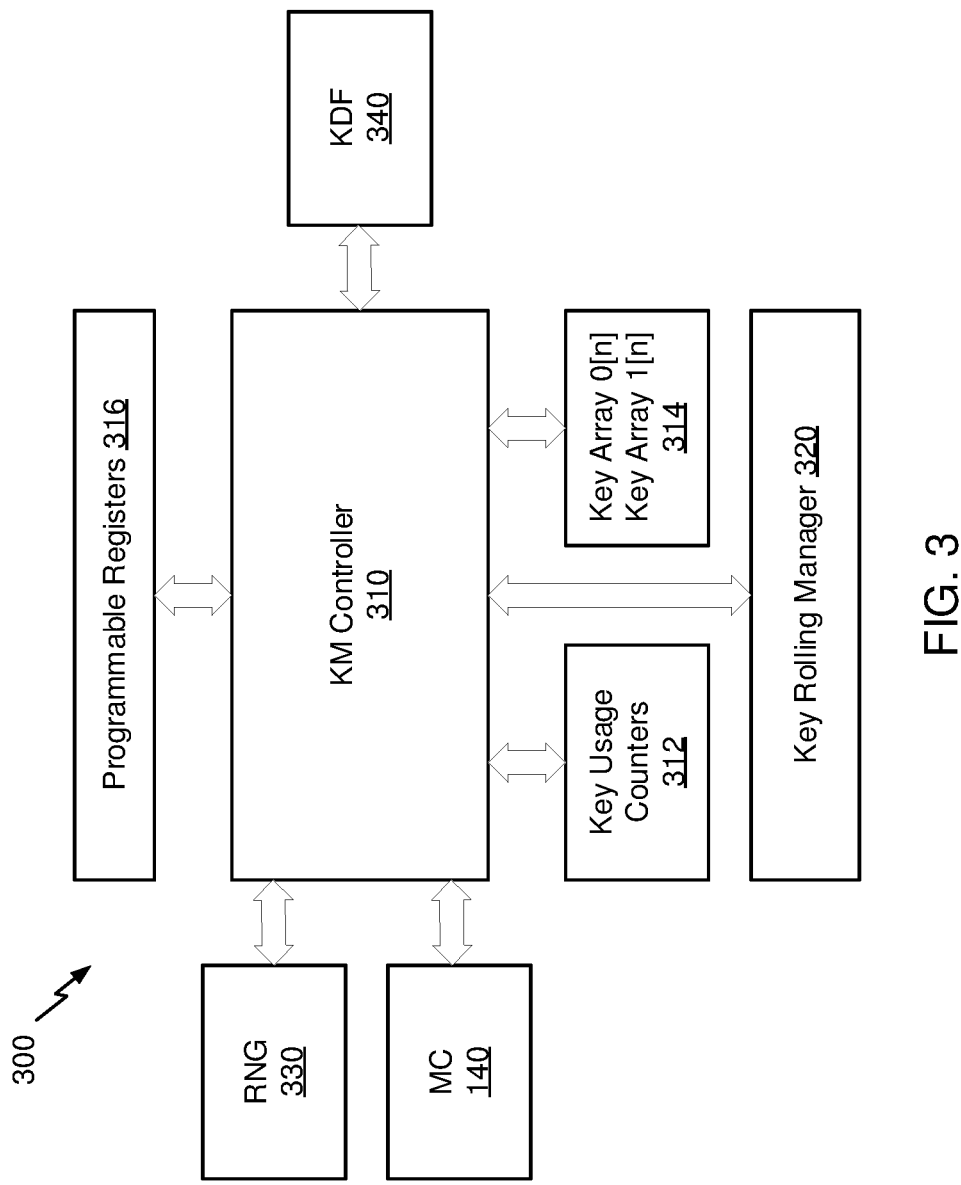
FIG. 3 illustrates a key management system, according to an example.

FIG. 3 illustrates a key management system 300, according to an example. As shown, the key management system 300 includes a key management controller 310, a key rolling manager 320, a random number generator (RNG) 330, and a key derivative function (KDF) circuit 340. The key management (KM) controller 310 is in communication with key usage counters 312, a key array(s) 314, programmable registers 316, and memory controller (MC) 140.

In operation, KM controller 310 populates key array(s) 314 with encryption/decryption keys, where each key is assigned to encrypt and/or decrypt a particular region of memory (e.g., a region of memory included in a DRAM module, high-bandwidth memory (HBM) module, SSD, HDD, etc.). Upon receiving a memory request to access a key associated with a particular region of memory, KM controller 310 increments a counter that corresponds to the key in key usage counters 312. For each memory request, the counter corresponding to the key may be compared to a key rolling threshold stored in programmable registers 316. If the counter exceeds the key rolling threshold, then KM controller 310 causes key rolling manager 320 to initiate a key rolling operation with respect to the associated region of memory.

During the key rolling operation, the region of memory is transitioned from a current key to a new key. In some embodiments, the current key that is implemented to encrypt/decrypt a particular region of memory is stored in a first key array 314, such as key array 314-0 shown in FIG. 4, and a new key that will be implemented to encrypt/decrypt the region of memory is stored in a second key array 314, such as key array 314-1 shown in FIG. 4. The key array(s) 314 may be stored in any type of memory (e.g., SRAM).

In order to seamlessly transition the region of memory from the current key to the new key, KM controller 310 tracks the portions of the region of memory that have been encrypted with the new key, and the portions of the region of memory that are still encrypted with the current key. When memory requests to the region of memory are received during the key rolling operation, KM controller 310 will cause the memory request to be completed with the new key when an address included in the memory request is within a portion of the region of memory that has already been encrypted with the new key. By contrast, KM controller 310 will cause the memory request to be completed with the current key when an address included in the memory request received during the key rolling operation is within a portion of the region of memory that has not yet been encrypted with the new key.

For example, key rolling manager 320 may begin encrypting the region of memory at a starting address (e.g., a base address of the region of memory), after which KM controller 310 tracks a current rolling address of the key rolling operation. Then, when a memory request (e.g., a DRAM request) is received by KM controller 310 during the key rolling operation, the KM controller 310 compares an address included in the memory request to the current rolling address. If the address included in the memory request is greater than the current rolling address, then KM controller 310 responds to the request with the current key (e.g., stored in key array 314-0). If, on the other hand, the address of the memory request is less than the current rolling address—indicating that the associated portion of memory has already been encrypted with the new key—then KM controller 310 responds to the request with the new key (e.g., stored in key array 314-1).

Once the entire region of memory has been encrypted with the new key, KM controller 310 sets a status value (e.g., a status bit) associated with the current key to invalid (e.g., '0') in the corresponding key array 314 (e.g., 314-0). Future memory requests to the region of memory are then completed with the new key, and the current key may be removed from the corresponding key array 314.

After the status of a particular entry in a key array 314 has been set to invalid, KM controller 310 populates the entry with a newly-generated key. The status value of the entry is then set to valid (e.g., '1'), and the counter associated with the key is reset. For example, in some embodiments, KM controller 310 continuously scans key array(s) 314 for invalid entries, populates the invalid entries with newly-generated keys, and sets the status values to valid. A counter (e.g., included in key usage counters 312) associated with each key is then reset to zero.

Figure 5:
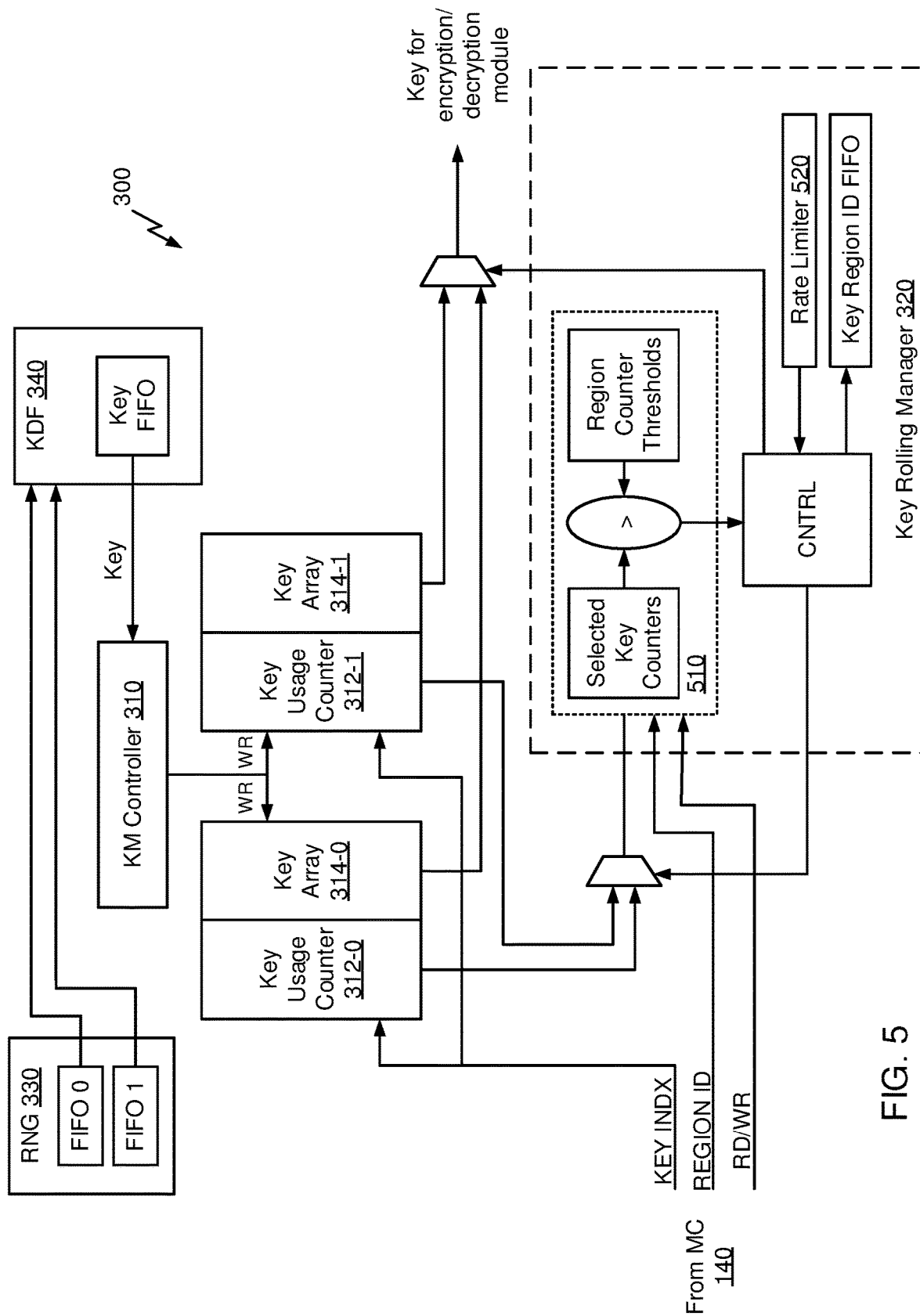
FIG. 5 illustrates a block diagram of a specific implementation of key management system according to one example.

For example, with reference to FIG. 4, KM controller 310 may detect that key 2 included in key array 314-0 and key 1 included in key array 314-1 are invalid. In response, KM controller 310 populates each entry with a new key generated by RNG 330 and KDF 340, and sets the corresponding counters to zero. Although FIGS. 3-5 illustrate the key usage counters 312 and key array(s) 314 as being implemented in separate data structures (e.g., tables), any number of key usage counters 312 and/or key array(s) 314 may be implemented in a single data structure or in any number of different data structures or circuit device(s).

As shown in FIG. 4, a number of keys n (e.g., 512, 1024, 4096, etc.) may be stored in each of key array 314-0 and 314-1. In some embodiments, a particular key (e.g., key 1 included in key array 314-0 and key 3 included in key array 314-1) may require more storage space and thus may occupy multiple entries, resulting in fewer total keys being stored in a given key array 314. This flexibility enables a variety of different key types (e.g., AES-XTS, AES-GCM) and key sizes (e.g., 256-bit, 512-bit, 4096-bit, etc.) to be implemented. Additionally, each key may correspond to a region of memory having any size (e.g., 32 kB, 256 KB, 512 KB, 1 MB, 128 MB, 4 GB, etc.). In general, implementing regions of memory having smaller sizes enable key rolling to be performed more quickly. In some embodiments, a particular region of memory (e.g., a 1 MB region) may be divided into smaller, sub-regions of memory (e.g., four 256 kB sub-regions), where each sub-region is assigned a different counter 312. All of the sub-regions of memory included in a given region may be associated with the same threshold(s) (e.g., key rolling threshold, attack threshold), which may be stored in programmable registers 316.

As described above, key management system 300 may implement multiple thresholds. A key rolling threshold may be based on a first number of memory requests received for a particular region (or sub-region) of memory, based on a rate at which memory requests are received, and/or based on a timer. Additionally, key management system 300 may implement a separate attack threshold, which may correspond to (i) a second, higher number of memory requests, (ii) an elevated rate at which memory requests are being received for a region (or sub-region) of memory, or (iii) a timer. The key rolling threshold(s) and attack threshold(s) may be stored in programmable registers 316. Once memory requests for a region of memory cross the attack threshold, key rolling manager 320 may allocate more bandwidth to the key rolling operation and/or may allocate less bandwidth (or no bandwidth) to user-initiated memory requests associated with the region of memory, in order to enable the key rolling operation to complete before the attacker detects the key. Bandwidth allocation associated with a given key rolling operation and user-initiated memory requests that occur during the key rolling operation may be stored in programmable registers 316 on a per region (or sub-region) basis.

In some embodiments, the attack threshold may be set as a percentage of the key rolling threshold (e.g., 110%, 120%, 150%, 200%, 300%, etc.). In a specific example, if the key rolling threshold—which triggers a key rolling operation for a particular region of memory—is set to 1,000 write requests, then an attack threshold may be set to 1,200 write requests. Consequently, if, after crossing the key rolling threshold, an attacker continues to aggressively issue write requests to the region of memory in order to detect the key before the key rolling operation is completed, then write requests may cross the attack threshold, causing the attacker's read or write requests to be throttled or blocked entirely.

In some embodiments, the above bandwidth control techniques that are implemented once a key rolling threshold and/or attack threshold are crossed may implement a "single leaky bucket" mechanism, where bandwidth usage of the key rolling operation and/or user-initiated memory requests are controlled based on a token system. For example, the key rolling operation may be allotted X number of tokens per period of time (e.g., 1 microsecond), where each memory request requires a token. When the number of tokens go to zero, key rolling manager 320 is not allowed to make any more memory requests to the region or sub-region of memory until additional tokens are received during the next period of time. Similarly, user-initiated memory requests may be allotted Y number of tokens per period of time which, when depleted, prevent a user from issuing further memory requests until additional tokens are received during the next period of time.

FIG. 5 illustrates a block diagram of a specific implementation of key management system 300 according to one example. As shown, memory requests are processed by MC 140, which generates a key index and a region ID for each incoming read (RD) and write (WR) requests. Key index corresponds to a particular key array 314 (e.g., key array 314-0 or 314-1) that stores a key for encrypting/decrypting a region of memory associated with the region ID.

Upon receiving a key index from MC 140, KM controller 310 outputs a corresponding key to an encryption/decryption module (e.g., a GCM or XTS module) and further outputs a counter value associated with the key (e.g., from key usage counters 312) to a comparison circuit 510. The comparison circuit 510 compares the counter value to one or more thresholds associated with the region ID (e.g., key rolling threshold and/or attack threshold). If the counter value is greater than an associated key rolling threshold, then key rolling manager 320 begins a key rolling operation with respect to the region of memory that corresponds to the region ID. If the counter value is greater than an associated attack threshold, then a rate limiter 520 in key rolling manager 320 modifies a bandwidth allocated to the key rolling operation and/or user-initiated memory requests.

As described above, in some embodiments, during a key rolling operation, a region of memory being key-rolled may be associated with a different key in each of two key arrays 314, such as key array 314-0 and key array 314-1 shown in FIG. 5. For example, during normal operation (e.g., when key rolling is not being performed on the region of memory), the region of memory may be encrypted based only on one, current key stored in key array 314-0. Subsequently, once a key rolling operation is initiated for the region of memory, KM controller 310 selects an entry from key array 314-1 and assigns a newly-generated key included in the entry to the region of memory. During the key rolling operation, the region of memory is associated with both the current key stored in key array 314-0 and the newly-generated key included in key array 314-1. Once the key rolling operation is complete, the current key stored in key array 314-0 is marked invalid, and the key in 314-1 becomes the current key for the region of memory, after which time the region of memory is again associated with only one, current key. Then, once a key rolling operation is again initiated for the region of memory, the above technique is performed again, where KM controller 310 selects an entry from key array 314-0 and assigns a newly-generated key included in the entry to the region of memory. In this manner, a given region of memory may "ping-pong" between key array 314-0 and key array 314-1, enabling key rolling to be performed while also ensuring that incoming memory requests for the region of memory can be completed.

In some embodiments, RNG 330 comprises a true random number generator that generates random numbers based on, for example, stochastic processes that are occurring within one or more circuit devices of SoC 100. Because such techniques typically require time for sufficient entropy to accumulate in the seed that is used to generate a random number, RNG 330 may generate random numbers on an ongoing basis and store the random numbers in one or more buffers, such as one or more first in, first out (FIFO) queues (e.g., FIFO 0 and FIFO 1). KDF 340 may further process the random numbers on an ongoing basis to generate new keys, which may be stored in the same or a different set of one or more buffers (e.g., a Key FIFO). This process ensures that KM controller 310 can continuously scan the key array(s) 314 for invalid entries and populate the invalid entries with newly-generated keys without significant delay.

Figure 6:
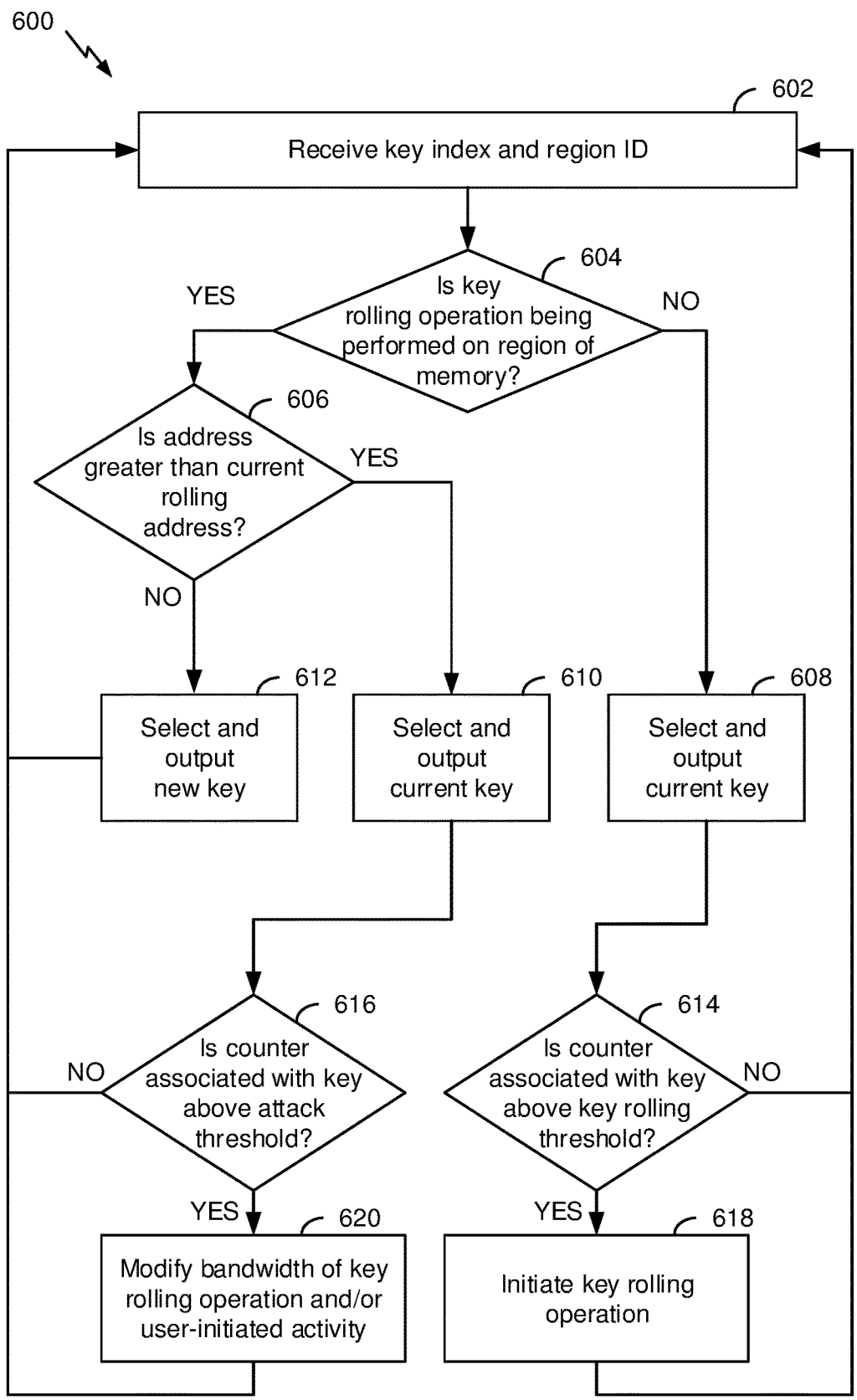
FIG. 6 is a flowchart of a method for accessing encrypted data, according to an example.

FIG. 6 is a flowchart of a method 600 for accessing encrypted data, according to an example. For ease of explanation, the method 600 is discussed in tandem with the circuitry illustrated in FIGS. 3 and 5.

At block 602, the KM controller 310 receives a key index and a region ID associated with a memory request (e.g., a memory request processed by MC 140). At block 604, KM controller 310 determines whether a key rolling operation is being performed with respect to a region of memory that corresponds to the region ID. In some embodiments, KM controller 310 determines whether a key rolling operation is being performed based on the key index. If KM controller 310 determines that no key rolling operation is being performed, then the method 600 proceeds to block 608, where KM controller 310 selects and outputs a current key (e.g., from key array 314-0) for encrypting/decrypting the region of memory.

Next, at block 614, KM controller 310 determines whether a counter associated with the current key is above the key rolling threshold. If KM controller 310 determines that the counter associated with the current key is above the key rolling threshold, then the method 600 proceeds to block 618, where KM controller 310 causes key rolling manager 320 to initiate a key rolling operation on the region of memory. The method 600 then optionally returns to block 602. If, at block 614, KM controller determines that the counter associated with the current key is not above the key rolling threshold, then method 600 optionally returns to block 602.

If, at block 604, KM controller 310 instead determines that a key rolling operation is being performed with respect to the region of memory associated with the region ID, then the method 600 proceeds to block 606, where KM controller 310 determines whether an address associated with the memory request is greater than a current rolling address. If KM controller 310 determines that the address is greater than the current rolling address, then the method 600 proceeds to block 610, where KM controller 310 selects and outputs the current key (e.g., from key array 314-0) for encrypting/decrypting the region of memory.

Next, at block 616, KM controller determines whether a counter associated with the current key is above an attack threshold. If KM controller 310 determines that the counter is above the attack threshold, then KM controller 310 causes key rolling manager 320 (e.g., rate limiter 520) to modify a bandwidth allocated to the key rolling operation (e.g., by providing additional bandwidth to the key rolling operation) and/or a bandwidth allocated to user-initiated memory requests (e.g., by throttling or eliminating bandwidth allocated to such requests). The method 600 then optionally returns to block 602. If, at block 616, on the other hand, KM controller 310 determines that the counter is not above the attack threshold, then the method 600 optionally returns to block 602.

If, at block 606, KM controller 310 instead determines that the address is not greater than the current rolling address, then method 600 proceeds to block 612, where KM controller 310 selects the new key (e.g., from key array 314-1) that is being implemented to perform the key rolling operation and outputs the new key to the encryption/decryption module. The method 600 then optionally returns to block 602.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method of accessing encrypted data, comprising:
   incrementing a count associated with a first key based on memory access requests directed to a memory region, wherein the memory region is encrypted based on the first key;
   initiating a key rolling operation to encrypt the memory region based on a second key when the count meets a first threshold;
   tracking an address range of the memory region that has been encrypted based on the second key, during the key rolling operation;
   receiving a first memory access request directed to the memory region during the key rolling operation;
   determining that an address of the first memory access request is outside of the address range;
   processing the first memory access request based on the first key; and
   performing an operation when the count meets a second threshold, wherein the operation comprises one or more of:
     increasing a rate at which the key rolling operation is performed;
     decreasing a rate at which memory access requests to the memory region are processed;
     increasing a bandwidth allocated to the key rolling operation; and
     decreasing a bandwidth allocated to memory access requests directed to the memory region.

2. The method of claim 1, further comprising:
   receiving a second memory access request directed to the memory region during the key rolling operation; and
   determining that an address of the second memory access request is within the address range; and
   processing the second memory access request based on the second key.

3. The method of claim 2, further comprising:
   storing the first key in a first key array associated with a first key index value;
   storing the second key in a second key array associated with a second key index value;
   determining, based on an address of the first memory access request, to process the first memory access request based on the first key index value;
   retrieving the first key from the first key array based on the first key index value;
   determining, based on the address associated with the second memory access request, to process the second memory access request based on the second key index value; and
   retrieving a second key from the second key array based on the second key index value.

4. The method of claim 1, wherein the operation comprises one or more of:
   the increasing the rate at which the key rolling operation is performed; and
   the decreasing the rate at which the memory access requests to the memory region are processed.

5. The method of claim 1, wherein the operation comprises one or more of:
   the increasing the bandwidth allocated to the key rolling operation; and
   the decreasing the bandwidth allocated to the memory access requests to the memory region.

6. The method of claim 1, wherein:
   the tracking comprises updating a current rolling address; and
   the address range comprises an address range of the memory region between a starting address and the current rolling address.

7. The method of claim 6, wherein the determining that the address of the first memory access request is outside the address range comprises:

determining that the address of the first memory access request is not between the starting address and the current rolling address.

8. The method of claim 6, wherein the determining that the address of the first memory access request is outside the address range comprises:
determining that the address of the first memory access request is greater than the current rolling address.

9. A method, comprising:
incrementing a first count associated with a first key based on memory access requests directed to a first memory region, wherein the first memory region is encrypted based on the first key;
initiating a first key rolling operation to encrypt the first memory region based on a second key when the first count meets a first threshold;
tracking an address range of the first memory region that has been encrypted based on the second key, during the first key rolling operation;
receiving a first memory access request directed to the first memory region during the first key rolling operation;
determining that an address of the first memory access request is outside of the address range;
processing the first memory access request based on the first key;
setting a first key status value corresponding to the first key to invalid when the first key rolling operation is complete;
storing the first key status value in a first key array, wherein the first key array comprises key status values associated with keys for encrypting and decrypting respective memory regions; and
performing one or more of:
storing a second key status value corresponding to the second key in a second key array, wherein the second key array comprises key status values associated with keys for encrypting and decrypting respective memory regions undergoing key rolling operations, and wherein the memory regions undergoing the key rolling operations are associated with the respective a key status values in the first and second key arrays; and
detecting that the first key status value is set to invalid in the first key array, populating an entry storing the first key with a replacement key, and setting a key status value of the replacement key to valid.

10. The method of claim 9, wherein the performing comprises:
the storing the second key status value corresponding to the second key in the second key array, and the associating each region of memory included in the regions of memory undergoing key rolling operations with the key status value of the first key array and the key status value of the second key array.

11. The method of claim 9, wherein the processing comprises:
the detecting that the first key status value is set to invalid in the first key array,
the populating the entry storing the first key with the replacement key; and
the setting the second key status value corresponding to the replacement key to valid.

12. The method of claim 11, further comprising:
incrementing a second count associated with a third key based on memory access requests directed to a second memory region, wherein the second memory region is encrypted based on the third key;
initiating a second key rolling operation to encrypt the second memory region based on the replacement key when the second count meets a second threshold; and
tracking an address range of the second memory region that has been encrypted based on the replacement key.

13. A system, comprising:
a processor and a memory encoded with instructions to cause the processor to:
increment a count associated with a first key based on memory access requests directed to a memory region, wherein the memory region is encrypted based on the first key;
initiate a key rolling operation to encrypt the memory region based on a second key when the first count meets a first threshold;
track an address range of the memory region that has been encrypted based on the second key, during the key rolling operation;
receive a first memory access request directed to the memory region during the key rolling operation; and
determine that an address of the first memory access request is outside of the address range;
process the first memory access request based on the first key; and
perform an operation when the count meets a second threshold, wherein the operation comprises one or more of:
increasing a rate at which the key rolling operation is performed;
decreasing a rate at which memory access requests to the memory region are processed;
increasing a bandwidth allocated to the key rolling operation; and
decreasing a bandwidth allocated to memory access requests to the memory region.

14. The system of claim 13, wherein the instructions further cause the processor to:
receive a second memory access request directed to the memory region;
determine that an address of the second memory access request is within the address range; and
process the second memory access request based on the second key.

15. The system of claim 14, wherein the instructions further cause the processor to:
store the first key in a first key array associated with a first key index value;
store the second key in a second key array associated with a second key index value;
determine, based on an address of the first memory request, to process the first memory access request based on the first key index value;
retrieve the first key from the first key array based on the first key index value;
determine, based on the address of the second memory access request, to process the second memory access request based on the second key index value; and
retrieve the second key from the second key array based on the second key index value.

16. The system of claim 13, wherein the instructions further cause the processor to:
receive a second memory access request directed to the memory region;
increment the count based on the second memory access request; and perform an operation when the count meets a first threshold, wherein the operation comprises one or more of:
   increasing a rate at which the key rolling operation is performed; and
   decreasing a rate at which memory requests directed to the memory region are processed.

17. The system of claim 13, wherein the instructions further cause the processor to:
   track the address range by updating a current rolling address, wherein the address range comprises an address range of the memory region between a starting address and the current rolling address;
   receive a second memory access request directed to the memory region during the key rolling operation; and
   determine that an address of the second memory access request is not between the starting address and the current rolling address; and
   process the second memory access request based on the first key.

18. The system of claim 14, wherein the instructions further cause the processor to:
   determine that the key rolling operation has completed, wherein an entire address range of the memory region is encrypted based on the second key; and
   in response to determining that the key rolling operation has completed, set a first key status value corresponding to the first key to invalid,
   wherein the first key status value is stored in a first key array, the first key array including a plurality of key status values, each key status value corresponding to a different key for encrypting and decrypting a different region of memory.

* * * * *